United States Patent [19]

Cole et al.

[11] Patent Number: 4,665,152

[45] Date of Patent: May 12, 1987

[54] CURABLE POLY(ARYLOXYPHOSPHAZENE) COPOLYMERS

[75] Inventors: William M. Cole, Norton; Joseph A. Dembek, Jr., Copley; Vispi R. Sagar, Canal Fulton, all of Ohio

[73] Assignee: The Firestone Tire & Rubber Company, Akron, Ohio

[21] Appl. No.: 773,907

[22] Filed: Sep. 9, 1985

[51] Int. Cl.$^4$ ............................................. C08G 79/02
[52] U.S. Cl. .................................................... 528/168
[58] Field of Search ............................... 528/167–169, 528/374, 392, 399

[56] References Cited

U.S. PATENT DOCUMENTS

| | | | |
|---|---|---|---|
| 3,856,713 | 12/1974 | Rose et al. ........................... | 528/168 |
| 3,994,838 | 11/1976 | Thompson et al. .................. | 528/168 |
| 4,026,838 | 5/1977 | Dieck et al. ........................ | 528/168 |
| 4,055,520 | 10/1977 | Dieck et al. ........................ | 528/168 |
| 4,055,545 | 8/1978 | Dieck et al. ........................ | 528/168 |
| 4,107,146 | 8/1978 | Dieck et al. ........................ | 528/168 |
| 4,116,785 | 9/1978 | Cheng .............................. | 528/168 X |
| 4,129,529 | 12/1978 | Fieldhouse et al. ................ | 528/168 |
| 4,179,555 | 12/1979 | Cheng et al. ........................ | 528/168 |
| 4,207,403 | 6/1980 | Cheng et al. ........................ | 528/168 |
| 4,242,493 | 12/1980 | Cheng et al. ........................ | 528/168 |
| 4,247,679 | 1/1981 | Hergenrother et al. ............ | 528/168 |

*Primary Examiner*—Veronica P. Hoke
*Attorney, Agent, or Firm*—Frank J. Troy, Sr.

[57] ABSTRACT

Low or no chlorine content poly(aryloxyphosphazene) copolymers useful for fireproof foams are surprisingly produced in a one step process without use of excess phenoxide reactant over a shorter than conventional time period by (a) adding linear $(NPCl_2)_n$ to a mixture of phenoxides comprising alkali or alkaline earth metal phenoxide, alkylphenoxide and allylphenoxide in quantities such that the total of the phenoxides is the equivalent of the total chlorine atoms in the $(NPCl_2)_n$ and allylphenoxide is present in an amount equivalent to from about 2% to about 10% of the chlorine atoms in the $(NPCl_2)_n$; and (b) reacting the admixture formed in step (a) at a temperature ranging from about 280° F. to about 320° F. for a time period ranging from about 7 hours to about 10 hours.

12 Claims, No Drawings

CURABLE POLY(ARYLOXYPHOSPHAZENE) COPOLYMERS

TECHNICAL FIELD

This invention is directed to a process for preparing low or no chlorine content poly(aryloxyphosphazene) copolymers useful for preparing fireproof foams. More particularly, it is directed to preparing such copolymers where part of the aryloxy groups are allylphenoxy groups.

BACKGROUND OF THE INVENTION

The product being produced is a particular copolymer where $(NPCl_2)_n$ has been reacted so that all but about 0.5% or less of the chlorine atoms have been replaced by a combination of phenoxy, alkylphenoxy and allylphenoxy. The allylphenoxy is included to furnish unsaturated groups to serve as cure sites in the resulting polymer for cross linking and vulcanization. The substantially complete replacement of the chlorine atoms is necessary for the product to be useful in certain fireproof foam formulations.

Conventionally, these copolymers with some substituents being allylphenoxy and substantially all the chlorine atoms replaced have been prepared in a two stage chlorine replacement process wherein the appropriate phenoxides were reacted with $(NPCl_2)n$. In the first stage all the allylphenoxide and less than the stoichiometric amount of alkylphenoxide and unsubstituted phenoxide were reacted with $(NPCl_2)_n$. In the second stage alkylphenoxide and unsubstituted phenoxide were used in excess to substantially replace the remaining chlorine atoms. The two stage reaction was utilized because it was thought that an excess of phenoxide was necessary to obtain substantial replacement of chlorine atoms and one stage was not desirably used with such an excess because alkylphenoxides and unsubstituted phenoxides react preferentially over allylphenoxide. The reaction was preferably carried out at 300° F. for 14 hours (time of reaction of both stages) with the total cycle time being about 24 hours. The use of an excess of phenoxide necessarily resulted in the need to remove the excess after reaction, and the relatively long reaction time sometimes resulted in degraded product.

One stage chlorine replacement reactions have been utilized in producing substantially chlorine free copolymers but the reaction was carried out utilizing an excess of phenoxide reactants and a relatively long reaction time i.e. 24 hours at a 300° F. temperature. See Cheng U.S. Pat. No. 4,116,785. Here again the use of excess phenoxide necessarily resulted in the need to remove the excess after reaction, and the relatively long reaction time could result in degraded product.

Dieck et al. U.S. Pat. No. 4,055,545 discloses making poly(aryoxyphosphazene) copolymer foams by reacting $(NPCl_2)_n$ with a mixture of phenoxides including unsaturated phenoxide, preferably using an excess of phenoxide reactants to assure complete reaction of all available chlorine atoms, at a temperature and length of time ranging from about 25° C. for 7 days to about 200° C. for 3 hours. Use of excess phenoxide as preferred requires removal of the excess after the reaction. Interpolation within the above range indicates a time of about 46 hours for a reaction temperature of 300° F., assuming a linear relationship.

Even where elastomeric copolymers were being prepared (with larger amounts of residual chlorine than mentioned above) so that a less than stoichiometric amount of phenoxide reactants were used, reaction conditions of 300° F. and 24 hours have been used (See Example 1 of Cheng et al. U.S. Pat. No. 4,179,555).

SUMMARY OF THE INVENTION

It has been discovered herein that poly(aryloxyphosphazene) copolymers suitable for use for fireproof foams with substantially no residual chlorine and containing a minor proportion of unsaturated cure sites for cross linking and vulcanization surprisingly can be prepared utilizing a one stage chlorine replacement reaction without utilizing excess phenoxide and utilizing significantly shorter reaction times at the reaction temperatures heretofore preferred. This process results in the advantages of less raw material (phenoxide) consumption, less reaction and cycle time (and consequently less energy consumption and less degrading of product), and low or no residual phenoxide to be removed after reaction.

The curable poly(aryloxyphosphazene) copolymer product produced by the method herein has the structural formula

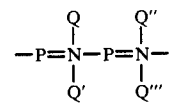

in which Q, Q', Q" and Q''' represent monovalent groups randomly distributed along the —P=N— backbone and in which Q represents phenoxy, Q' represents alkylphenoxy, Q" represents allylphenoxy, Q''' represents residual chlorine atoms, and in which the total of Q and Q' groups have replaced from about 90 to about 98% of the chlorine atoms originally present in the $(NPCl_2)_n$, in which Q" groups have replaced from about 2% to about 10% of the chlorine atoms originally present, and Q''' groups are present at a level of from 0% to about 0.5% of the chlorine atoms originally present.

The product is prepared by a method comprising the steps of (a) adding linear $(NPCl_2)_n$ wherein n is from 20 to about 50,000 to a mixture of phenoxides comprising alkali or alkaline earth metal phenoxide, alkali or alkaline earth metal alkylphenoxide and alkali or alkaline earth metal allylphenoxide in quantities such that the total of the phenoxides (i.e. the total of phenoxide, alkylphenoxide and allylphenoxide) is the equivalent of 100% of the total chlorine atoms in the $(NPCl_2)_n$ and allylphenoxide is present in an amount equivalent to about 2% to about 10% of the chlorine atoms in the $(NPCl_2)_n$;

(b) reacting the admixture formed in step (a) at a temperature ranging from about 280° F. to about 320° F. for a time period ranging from about 7 hours to about 10 hours.

Preferably the allylphenoxide reactant is sodium ortho-allylphenoxide and the resulting Q" substituent is ortho-allylphenoxy.

Preferably, in step (a) the linear $(NPCl_2)_n$ is added in the form of a solution wherein the solvent consists by volume of 100% to about 80% cyclohexane and 0 to about 20% $C_5$–$C_7$ alkane and the phenoxides to which the linear $(NPCl_2)_n$ is added are present as a solution where the solvent comprises tetrahydrofuran and a homogeneous reaction mixture is provided.

Residual phenoxide in the reaction mixture resulting from step (b) is neutralized, the neutralized admixture is desalted, and the poly(aryloxyphosphazene) copolymer product is recovered from the desalted admixture, for example, by causing coagulation and separating the resulting rubber phase or by other recovery methods.

The copolymer product is readily used to prepare fireproof foams using conventional blowing agents.

Curing is readily carried out by utilizing free radical initiators, conventional sulfur curing or vulcanizing additives known in the rubber art or other reagents often even in the absence of accelerators, using conventional amounts, techniques and processing equipment.

DETAILED DESCRIPTION

The copolymers produced herein have randomly repeating units represented by the formulas:

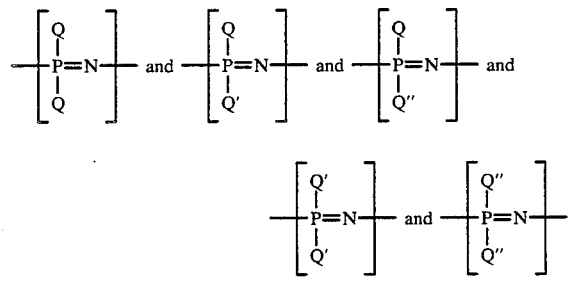

and where residual chlorine is present also

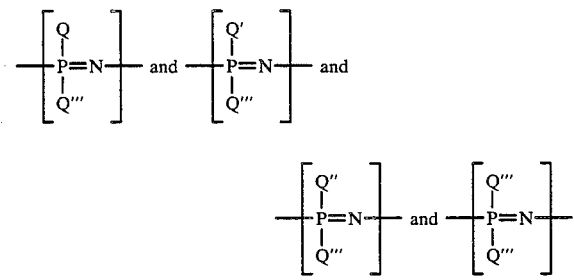

Preferably, reaction is carried out until the product has substantially no residual chlorine on the —P—N— backbone, i.e. less than 0.01% of the original chlorines are present.

We turn now in detail to the process herein.

The linear dichlorophosphazene polymer, i.e. the $(NPCl_2)_n$, admixed in step (a) referred to above has a degree of polymerization ranging from about 20 to about 50,000. It normally has a dilute solution viscosity in toluene ranging from 0.6 to 1.6. It is well known in the art and is readily prepared by polymerizing cyclic oligomer, preferably trimer, by bulk or solution polymerization by methods well known in the art. Crude polymer is readily prepared as described, for example, in the following patents: Fieldhouse et al. U.S. Pat. No. 4,327,064; Reynard et al. U.S. Pat. No. 4,257,917; Fieldhouse et al. U.S. Pat. No. 4,226,840; Helasa et al. U.S. Pat. No. 4,225,567; Prichard et al. U.S. Pat. No. 4,137,330; Snyder et al. U.S. Pat. No. 4,123,503; Reynard et al. U.S. Pat. No. 4,005,171; Rose U.S. Pat. No. 3,515,688; and Allcock et al. U.S. Pat. No. 3,370,020. The crude polymer is readily purified to reduce the oligomer content therein as described, for example, in Tate et al. U.S. Pat. No. 3,755,537 or Fieldhouse et al. U.S. Pat. No. 4,226,840 or Fieldhouse et al. U.S. Pat. No. 4,327,064. Purified linear dichlorophosphazene polymer is preferably utilized in step (a).

The linear $(NPCl_2)_n$ is preferably dissolved for admixture in step (a) in a solvent which does not interfere with reaction in step (b). Suitable solvents include, for example, benzene and toluene. The preferred solvent is cyclohexane. However, in climates where the temperature falls below about 45° F. a solution of linear $(NPCl_2)_n$ in 100% cyclohexane can freeze. To lower the freezing point, up to 20% by volume of cyclohexane can be replaced by alkane having from 5 to 7 carbon atoms, such as pentane, hexane, or heptane.

The solution of linear $(NPCl_2)_n$ which is added in step (a) preferably contains by weight from about 2% to about 12% normally solid linear $(NPCl_2)_n$.

Turning now to the phenoxides used as reactants, allylphenoxide is preferably used in an amount equivalent to from about 5% to about 8% of the chlorine atoms in the $(NPCl_2)_n$, and unalkylated phenoxide (hereinbefore designated alkali or alkaline earth metal phenoxide) and alkylphenoxide are each present in a quantity equivalent to from about 40% to about 60% of the chlorine atoms in the $(NPCl_2)_n$ with the total of the phenoxide, alkylphenoxide and allylphenoxides being stoichiometric for replacement of 100% of the chlorine atoms in the $(NPCl_2)_n$.

The allylphenoxide reactant has the formula $M(Q'')_z$ wherein M is alkali metal (preferably sodium, potassium or lithium) or alkaline earth metal (preferably calcium or magnesium) and $Q''$ is defined as above and z is 1 in the case where M is alkali metal and 2 in the case where M is alkaline earth metal; $M(Q'')_z$ is reacted to replace chlorine with $Q''$ and also to form $MCl_z$. The ortho-allylphenoxides are the preferred allylphenoxide reactants, especially sodium ortho-allylphenoxide. Para-allylphenoxides, e.g. sodium para-allylphenoxide, are also very useful.

The unsubstituted phenoxide reactant has the formula $M(Q)_z$ wherein M is alkali metal (preferably sodium, potassium or lithium) or alkaline earth metal (preferably calcium or magnesium) and Q is defined as above and z is 1 where M is alkali metal and 2 where M is alkaline earth metal; $M(Q)_z$ is reacted to replace chlorine with Q and also to form $MCl_z$. Sodium phenoxide is the preferred unsubstituted phenoxide reactant.

The alkylphenoxide reactant has the formula $M(Q')_z$ wherein M is alkali metal (preferably sodium, potassium or lithium) or alkaline earth metal (preferably calcium or magnesium) and $Q'$ is defined as above and z is 1 where M is alkali metal and 2 where M is alkaline earth metal; $M(Q')_z$ is reacted to replace chlorine with $Q'$ and also to form $MCl_z$. Normally the alkyl group contains from 1 to 10 carbon atoms, preferably from 1 to 4 carbon atoms. Preferably, the alkylphenoxide reactant is sodium p-ethylphenoxide. Other suitable alkylphenoxide reactants include, for example, sodium p-methylphenoxide, sodium o-methylphenoxide, sodium m-methylphenoxide, lithium p-methylphenoxide, lithium o-methylphenoxide, lithium m-methylphenoxide, sodium o-ethylphenoxide, sodium m-ethylphenoxide, potassium p-n-propylphenoxide, potassium o-n-propylphenoxide, potassium m-n-propylphenoxide, magnesium p-n-propylphenoxide, sodium p-isopropylphenoxide, sodium m-isopropylphenoxide, calcium p-isopropylphenoxide, calcium m-isopropylphenoxide, sodium p-sec butylphenoxide, sodium m-sec butylphenoxide, lithium n-sec butylphenoxide, lithium m-sec butylphenoxide, lithium p-tert. butylphenoxide, lithium m-tert. butylphenoxide, potassium p-tert. butyl phenoxide, potassium m-tert. butylphenoxide, sodium p-tert. butylphenoxide, sodium m-tert. butylphenoxide, sodium p-nonylphenoxide and sodium m-nonylphenoxide.

The aforementioned phenoxides are formed in known manner, for example, by reacting alkali metal or alkaline earth metal with a mixture of the appropriate phenols in tetrahydrofuran.

Preferably, in step (a) of the process herein, the phenoxides to which the linear $(NPCl_2)_n$ is added are present as a solution wherein the solvent comprises tetrahydrofuran. This is convenient because the phenoxides are readily formed in tetrahydrofuran as described above. If desired, up to 50% or more of the tetrahydrofuran can be replaced by other solvents which do not interfere with the reaction of step (b) of the process herein, e.g. cyclohexane or $C_5$–$C_7$ alkane.

It is desirable to carry out step (b) of the process herein in a homogeneous system, i.e. using solvents such that the copolymer reaction product remains dissolved in the reaction solvents as use of such a homogeneous system improves the reaction kinetics of the chlorine replacement reaction. Where the solvents utilized in dissolving the reactants admixed in step (a) of the process herein are tetrahydrofuran, cyclohexane and optionally $C_5$–$C_7$ alkane, the ratio of tetrahydrofuran to cyclohexane and $C_5$–$C_7$ alkane in the admixture formed in step (a) herein preferably ranges from 0.8:1 to 3:1; this range provides a homogeneous admixture of reactants and a homogeneous system in step (b) herein where the reaction product remains dissolved and isolation of the reaction product from the solvent can be carried out efficiently.

The admixing in step (a) provides an exothermic interaction whereby the temperature of the admixture rises to about 120° F. over a period of, for example, 15 minutes to 45 minutes after $(NPCl_2)_n$ addition. It is economically desirable to allow this exothermic interaction to occur prior to heating to the reaction temperature to be used in step (b).

Preferably, the reaction of step (b) herein is carried out at a temperature ranging from about 295° F. to about 305° F. and reaction is carried out for a period of about 7.5 to about 9 hours. Reaction is carried out until the appropriate completeness is obtained. When the aforementioned preferred solvents are utilized, the reaction is readily carried out in a pressure reactor to obtain the appropriate reaction temperatures.

Once reaction has been carried out to the appropriate completeness, the reaction mixture is preferably cooled, e.g. to ambient temperature, e.g. by circulating cooling water through a jacket on the reaction vessel, to thereby minimize the possibility of the product degrading.

Since a stoichiometric amount of phenoxide is utilized and essentially complete reaction is obtained (residual chlorine is present in the copolymer product at a level of at most about 0.5% of the chlorine atoms originally present and preferably the copolymer product contains substantially no residual chlorine atoms), little or no residual phenoxide reactant is present at the completion of step (b). To the extent residual phenoxide reactant is present, it is readily neutralized with an acid such as sulfuric acid or hydrochloric acid or by treatment with carbon dioxide and water as is conventional in the art.

The reaction mixture formed in step (b), after neutralization, if any, is desalted, for example, by treating the reaction mixture with water, i.e. by washing, preferably with water including a surfactant as described in Longo et al. U.S. Pat. No. 4,477,656, e.g. by pouring the reaction mixture into a larger volume of water and separating the phases and repeating the procedure, if necessary, until desalting is essentially completed. Various coalescing media can advantageously be employed to aid in phase separation. Desalting can also involve filtering or centrifugation.

Solvent is readily removed from the desalted admixture by methods well known in the art, e.g. by adding methanol to coagulate the product or by injecting desalted admixture into water and sparging with steam or by using an extruder drier.

The poly(oxyarylphosphazene) copolymer product is readily formed into a foam and cured (thereby producing a fireproof foam). Suitable blowing agents are well known in the art. Curing is readily carried out, e.g. using sulfur accelerated cures in the same manner as rubber is vulcanized, e.g. utilizing 0.25 to about 5.0 parts of sulfur per 100 parts of poly(aryloxyphosphazene) copolymer. Curing is also readily carried out without the use of sulfur by means of high energy electrons (e.g. dosages of 1 to 15 megarads) or in the presence of free radical initiators such as ultraviolet light or peroxide initiators such as benzoyl peroxide, bis(2,4-dichlorobenzoyl peroxide, di-tert-butyl peroxide, dicumyl peroxide, 2,5-dimethyl(2-5-di-tert-butyl peroxy) hexane, t-butyl perbenzoate and similar peroxides.

The invention is illustrated by the following detailed example:

EXAMPLE

A phenoxide mixture is made up as follows: Distilled phenols (1.8513 gram mole of phenol, 1.5206 gram mole of p-ethylphenol, 0.2526 gram mole of o-allylphenol) and sodium metal (3.625 gram mole) are added into separate bottles, and tetrahydrofuran (THF) is added into each bottle, and the bottles are capped (all these steps are carried out in a dry-box). About 410 ml of THF is added to the phenol mixture and 545 ml of THF is added to the sodium. The Na/THF mixture is added to a three-necked flask equipped with a stirrer, dropping funnel and $N_2$ purge line. Under $N_2$ purge, the mixture of phenols in THF is added dropwise with stirring to the flask containing the Na/THF mixture, over 2 hours at room temperature. The reaction mixture is brought to 70° C. and stirred for 8 hours until reaction is substantially complete. Unreacted sodium is removed by filtration under $N_2$ atmosphere. The resulting solution of sodium phenoxide, sodium p-ethylphenoxide and sodium o-allylphenoxide is introduced into a dry pressure reactor equipped with stirrer, thermometer, water circulation cooling jacket and heating means.

Then 3.625 grams moles of polydichlorophosphazene polymer, i.e. $(NPCl_2)_n$ having a dilute solution viscosity in toluene of 0.85 dl/g dissolved in 2359 ml of cyclohexane (the solution contains 10.3% normally solid material) is charged to the reactor over a period of 30 minutes. The phenoxides in the reactor are the stoichiometric equivalent of the total chlorine atoms in the $(NPCl_2)_n$ (the sodium phenoxide is equivalent to 51% of said chlorine atoms, the sodium p-ethylphenoxide is equivalent to 42% of said chlorine atoms, and the sodium o-allylphenoxide is equivalent to 7 percent of said chlorine atoms).

The admixture is allowed to stand for 30 minutes during which time the temperature rises to approximately 120° F.

The reaction admixture is then heated to 300° F. This takes about 30 minutes. The temperature is maintained at 300°±5° F. for 8 hours after 295° F. is reached whereby substantially complete replacement of chlorine occurs.

After reaction is completed, the batch is cooled to approximately 75° F. by circulation of water through the reactor cooling jacket.

The resulting admixture is sufficiently phenoxide free so that neutralization may not be necessary. The pH of the admixture is adjusted to 5.5 to 6.0 using sulfuric acid.

The resulting admixture is desalted by extraction with an amount of water equal to 30% of the total batch weight, containing a sulfated fatty acid ester surfactant (Dymsol PA available from Diamond Shamrock) at 0.5 weight percent of the total batch weight. After gravity settling and decanting, the remaining brine droplets in the polymer solution phase are removed by passage through a coalescing device which employs wound polypropylene elements. The desalted reaction solution contains by weight 7.7% normally solid material.

Polyaryloxyphosphazene copolymer product is coagulated from the desalted reaction solution by addition of methanol and is separated and dried.

The product contains less than 0.01% of the original chlorines. The cycle time (from charging of phenoxides into the reactor to obtaining dried product) is about 10 hours (compared to about 24 hours in a conventional two stage process involving a 14 hour total reaction time).

Other variations will be evident to those skilled in the art. Therefore, the scope of the invention is intended to be defined by the claims.

What is claimed is:

1. Method for preparing a curable poly(aryloxyphosphazene) copolymer comprising the steps of
   (a) adding linear $(NPCl_2)_n$ wherein n is from 20 to about 50,000 to a mixture of phenoxides consisting of alkali or alkaline earth metal phenoxide, alkali or alkaline earth metal alkylphenoxide and alkali or alkaline earth metal allylphenoxide in quantities such that the total of the three kinds of phenoxide reactants is the equivalent of 100% of the total chlorine atoms in the $(NPCl_2)_n$ and allylphenoxide is present in an amount equivalent to about 2% to about 10% of the chlorine atoms in the $(NPCl_2)_n$;
   (b) reacting the admixture formed in step (a) at a temperature ranging from about 280° F. to about 320° F. for a time period ranging from about 7 hours to about 10 hours; to thereby produce poly(aryloxyphosphazene) copolymer having the structural formula

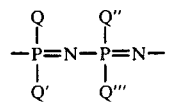

in which Q, Q', Q" and Q'" represent monovalent groups randomly distributed along the —P=N— backbone and in which Q represents phenoxy, Q' represents alkylphenoxy, Q" represents allylphenoxy, Q'" represents residual chlorine atoms, and in which the total of Q and Q' groups have replaced from about 90 to about 98% of the chlorine atoms originally present in the $(NPCl_2)_n$, in which Q" groups have replaced from about 2% to about 10% of the chlorine atoms originally present and Q'" groups are present at a level of from 0% to about 0.5% of the chlorine atoms originally present.

2. The method of claim 1 wherein the product has substantially no residual chlorine atoms on the —P=N— backbone.

3. The method of claim 2 wherein the reaction temperature in step (b) ranges from about 295° F. to about 305° F.

4. The method of claim 3 wherein in step (a) the alkali or alkaline earth metal phenoxide is present in the mixture of phenoxides in a quantity equivalent to from about 40% to about 60% of the chlorine atoms in the $(NPCl_2)_n$ and the alkali or alkaline earth metal alkylphenoxide is present in the mixture of phenoxides in a quantity equivalent to from about 40% to about 60% of the chlorine atoms in the $(NPCl_2)_n$.

5. The method of claim 4 wherein the allylphenoxide is sodium ortho-allylphenoxide and is used in an amount equivalent to from about 5% to about 8% of the chlorine atoms in the $(NPCl_2)_n$.

6. The method of claim 5 wherein the alkali or alkaline earth metal phenoxide is sodium phenoxide and the alkali or alkaline earth metal alkylphenoxide is sodium p-ethylphenoxide.

7. The method of claim 4 wherein the linear $(NPCl_2)_n$ is added as a solution wherein the solvent consists by volume of 100% to about 80% cyclohexane and 0 to about 20% $C_5$–$C_7$ alkane and the phenoxides to which the linear $(NPCL_2)_n$ is added are present as a solution wherein the solvent comprises tetrahydrofuran.

8. The method of claim 7 wherein the solution of linear $(NPCl_2)_n$ which is added contains by weight from about 2% to about 12% linear $(NPCl_2)_n$ and in the admixture resulting from step (a), the volume ratio of tetrahydrofuran to cyclohexane plus $C_5$–$C_7$ alkane ranges from 1:1 to 3:1.

9. The method of claim 7 wherein the admixture resulting from step (a) is allowed to achieve a temperature of about 120° F. as a result of exothermic interaction prior to being brought to the temperature of step (b).

10. The method of claim 7 wherein residual phenoxide in the reaction mixture resulting from step (b) is neutralized.

11. The method of claim 10 wherein the neutralized admixture is desalted.

12. The method of claim 11 wherein poly(aryloxyphosphazene) copolymer is recovered from the desalted admixture by causing coagulation and separating the resulting rubber phase.

* * * * *